United States Patent [19]
Wishart

[11] Patent Number: 5,967,583
[45] Date of Patent: Oct. 19, 1999

[54] MULTI-LEVEL RECREATIONAL VEHICLE

[76] Inventor: Randell J. Wishart, P.O. Box 47, Silver Springs, Nev. 89429

[21] Appl. No.: 09/004,705

[22] Filed: Jan. 8, 1998

[51] Int. Cl.⁶ .................................................. B60P 3/325
[52] U.S. Cl. .......................... 296/24.1; 296/156; 296/164
[58] Field of Search .................................. 296/164, 24.1, 296/156

[56] References Cited

U.S. PATENT DOCUMENTS

| | | |
|---|---|---|
| 1,468,710 | 9/1923 | Leindorf . |
| 1,905,842 | 4/1933 | Forrester . |
| 2,563,917 | 8/1951 | Caesar et al. . |
| 2,589,894 | 3/1952 | Ten Eyck . |
| 3,029,102 | 4/1962 | Mueller . |
| 3,050,330 | 8/1962 | Willson .................................. 296/156 |
| 3,054,469 | 9/1962 | Muller . |
| 3,608,954 | 9/1971 | Lynd . |
| 3,774,956 | 11/1973 | Barlow . |
| 3,971,455 | 7/1976 | Molzon . |
| 4,103,958 | 8/1978 | Parent . |
| 4,406,477 | 9/1983 | McDonald . |
| 4,997,165 | 3/1991 | Wiese . |
| 5,173,052 | 12/1992 | Duncan, Jr. . |
| 5,197,774 | 3/1993 | Diaz . |
| 5,374,094 | 12/1994 | Smith et al. . |

FOREIGN PATENT DOCUMENTS

| | | |
|---|---|---|
| 458591 | 7/1950 | Italy . |
| 14657 | of 1896 | United Kingdom . |

*Primary Examiner*—Gary C. Hoge
*Attorney, Agent, or Firm*—James M. Ritchet

[57] ABSTRACT

A multi-level recreational vehicle having a body chassis, with side walls, wherein the body chassis is supported on frame rails, wherein the recreational vehicle comprises a lower level having a floor and a ceiling, wherein the lower level floor has a walking portion proximate the frame rails; an intermediate level having a floor and a ceiling, wherein the intermediate level floor staggers with the lower level ceiling; and an upper level having a floor, wherein the floor comprises a deck for recreational or leisure purposes, including hot tubing. Peripherally bordering the upper level is a collapsible railing, wherein the collapsed railing is received by sleeves on or in the side walls of the recreational vehicle.

18 Claims, 3 Drawing Sheets

MULTI-LEVEL RECREATIONAL VEHICLE

BACKGROUND OF THE INVENTION

1. Field of the Invention

A multi-level recreational vehicle is provided that maximizes available living space. More specifically, a recreational vehicle is disclosed that comprises at least three levels for living space, wherein the levels are stationary and non-collapsible. This multi-level recreational vehicle uses the combination of a lower level portion positioned proximate the frame rails of the body chassis, staggered positioning of the lower level and the intermediate level, and a deck on the upper level, with a means for accessing each level.

2. Description of the Background Art

Available living space of a recreational vehicle is limited by the dimensional restrictions for highway-use. For transport of the vehicle, the dimensions of the vehicle must be within prescribed specifications for height clearance, weight distribution, and safety. Several vehicle designs have been developed in an attempt to maximize the available space within the prescribed specifications for highway transit. However, none has disclosed a multi-level recreational vehicle that maximizes the available living space as provided in this invention.

U.S. Pat. No. 1,468,710, issued in January of 1922, reveals a passenger bus with a lower or first interior deck and an upper or second exterior deck. A stairway from the forward part of the lower interior deck leads upward towards an entrance opening at the forward part of the exterior upper deck. The interior deck floor is positioned above the frame rails.

Disclosed in U.S. Pat. No. 1,905,842, issued in April of 1932, is a double deck vehicle for carrying passengers. The first deck is at a common level, wherein the first deck floor is positioned above the vehicle axles or frame rails. The second or upper enclosed deck is constructed of two different levels wherein the aisle floor is lower than the seat floor. The aisle on the common level is staggered with respect to the upper. A quarter-turn stairway fixed at the lower deck aisle extends vertically and fixes to the upper deck aisle for access to the upper deck. The first level floor is positioned above the wheel center and the frame rails.

U.S. Pat. No. 2,563,917, issued in October of 1944, presents a double-deck coach with the aisle and the baggage compartment of the lower deck positioned on the right and left side, respectively, and with the aisle and the baggage compartment of the upper deck positioned on the left and right side, respectively. The lower deck has a portion that is depressed so as to be somewhat lower than the center of the wheels. From a center vestibule, wherein the center vestibule comprises a washroom, a water cooler, and an attendant's station, the upper deck is accessed by stationary steps emerging from the lower deck. The upper deck comprises a plurality of seats placed back to back for accommodation of passengers. The lower deck may be used as a smoking room, for card playing, for sleeping space or for freight or baggage space.

Revealed in U.S. Pat. No. 2,589,894, issued in November of 1948, is a two-deck trailer having a staggered arrangement of full height upstairs and downstairs spaces. The shorter or less than full height spaces are utilized with the bed spaces, cabinets, closets, and the like. The upper or second deck is in communication with the lower or first deck by a fixed stairway. The trailer only has a lower and an upper level, wherein the lower deck does not utilize the space available below the frame rails.

A collapsible vehicular structure is disclosed in U.S. Pat. No. 3,608,954, issued in May of 1969, wherein the invention provides a vehicular cabin with a second story. The second or upper story is a cabin extension that has a peripheral side wall, a roof, a collapsible railing and a window. The upper story is collapsible for transit, wherein the side walls of the structure are telescopically interrelated. Access to the extended collapsible upper story is provided by an opening in the upper wall of the lower or first story that may be closed by a cover.

U.S. Pat. No. 3,774,956, issued in November of 1971, reveals parallel attachable, two story expandable, trailable building structures, wherein the roof sections of the upper or second story are foldable and collapsible. The structures can be attached, while stationary, together in a parallel fashion to give the appearance of a clustered town-house complex.

Issued in September of 1975 is U.S. Pat. No. 3,971,455 which describes a double deck bus with a passageway in the upper or second deck being offset from the lower or first deck passageway. A stationary curved stairway ascends from an area adjacent to the lower deck entrance and extends to the upper deck passageway. The lower deck extends level above the center of the wheels.

Provided in U.S. Pat. No. 4,103,958 is a camping vehicle body, which was issued in March of 1977. The camping vehicle constitutes a bus body with a second floor, wherein the second floor has a collapsible roof and collapsible side walls. A livable space on the second or upper level is created by lifting the collapsible roof, relative to the upper level floor.

A recreational vehicle with telescopic elevator shaft and floating second floor is related in U.S. Pat. No. 5,374,094, issued in December of 1994. This invention includes a lower body and a vertically telescoping upper body. The upper level must be lowered for transport. Access to the upper level from the lower level is achieved by an elevator with an elevator shaft comprising fixed first story panels and sliding second story panels. The lower body floor extends horizontally level above the wheel axles.

Also disclosed in U.S. Pat. No. 4,997,165, issued in August of 1988, is a safety rail for collapsible bleachers. The safety rail is for attachment and application particularly to a foldable or collapsible bleacher, wherein the safety rail telescopically collapses or extends along with the collapse or extension of the bleacher assembly of which they form a part.

The foregoing patents reflect the state of the art of which the applicant is aware and are tendered with the view toward discharging applicant's acknowledged duty of candor in disclosing information which may be pertinent in the examination of this application. It is respectfully submitted, however that none of these patents teaches or renders obvious, single or when considered in combination, applicant's claimed invention.

SUMMARY OF THE INVENTION

An object of the present invention is to provide a multi-level recreational vehicle that maximizes the available living space within the restricted parameters required for highway use.

Another object of the present invention is to furnish a multi-level recreational vehicle that has fixed stories thereby not requiring movement of furniture or other items, which is generally necessary for a collapsible multi-level vehicle.

A further object of the present invention is to supply a multi-level recreational vehicle that does not hamper the highway maneuverability of the vehicle with the increased use of available space.

Still another object of the present invention is to introduce a multi-level recreational vehicle that allows comfortable and easy access to the multiple levels while minimizing space used for the access means.

Yet another object of the present invention is to describe a multi-level recreational vehicle that allows for a practical use of the top or roof of the vehicle as living space, whereby the top of the vehicle may allow for comfortable viewing of sporting events or natural scenes or allow for recreational activities such as sunbathing, barbecuing or hot tubing.

Still a further object of the present invention is to provide a multi-level recreational vehicle that has high ceiling space at the entrance thereby conveying a "roomy atmosphere."

Yet a further object of the present invention is to introduce a multi-level recreational vehicle having at least three levels with a highway transport height similar to the average height of a conventional recreational vehicle, which is approximately eleven feet or less.

Disclosed is a multi-level recreational vehicle having a body chassis supported on frame rails, wherein the recreational vehicle comprises at least three levels designed for living space that are fixed and non-collapsible with means for accessing the levels, wherein the levels include a lower level, an intermediate level, and an upper level. The lower level has a walking portion positioned proximate the frame rails, and the lower level and the intermediate level are staggered. The upper level comprises a deck wherein the deck may be peripherally bordered by a railing.

Other objects, advantages, and novel features of the present invention will become apparent from the detailed description that follows, when considered in conjunction with the associated drawings.

DESCRIPTION OF THE PREFERRED EMBODIMENT

Figure 1:
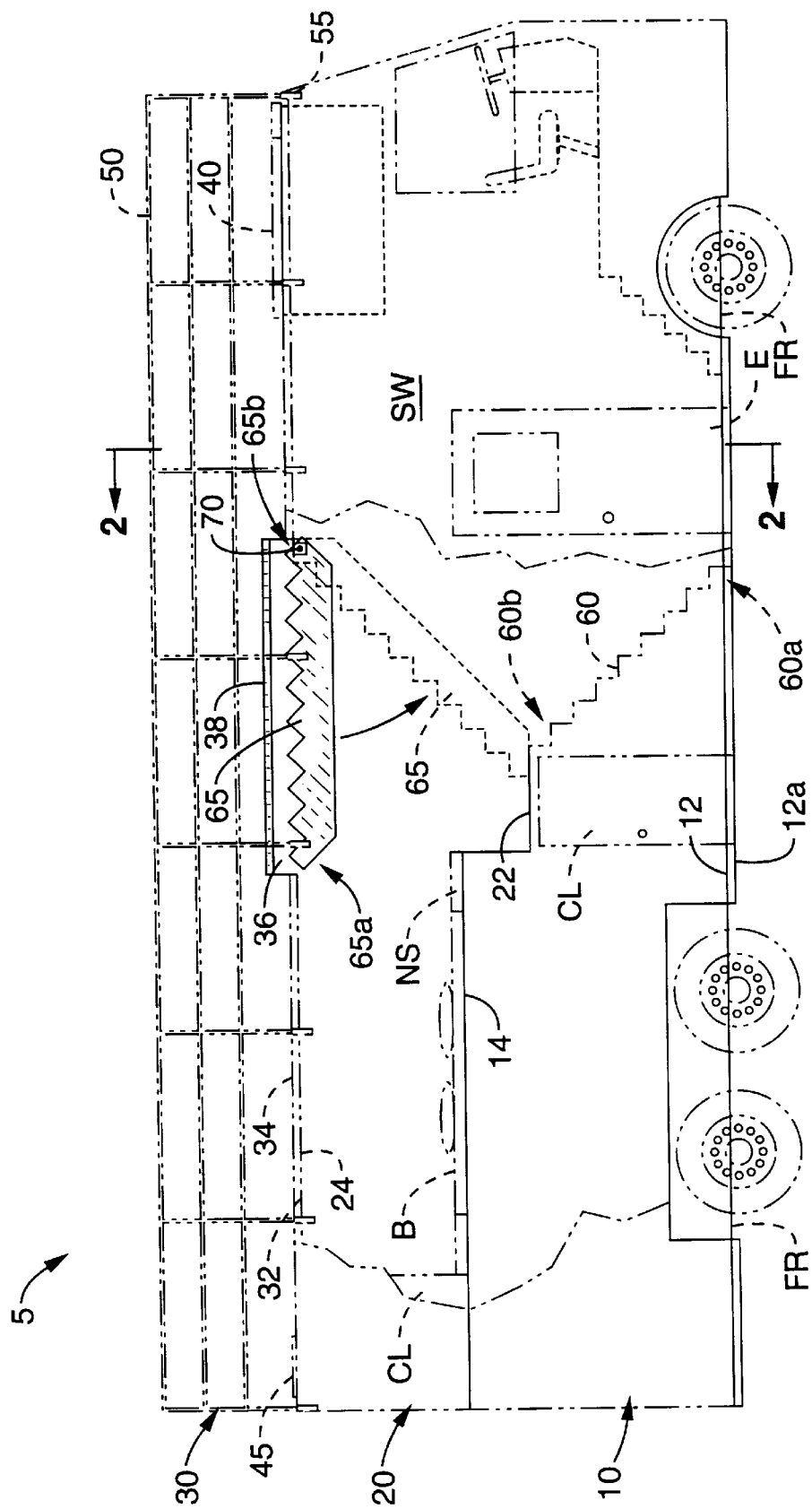
FIG. 1 is a side view of the invention with a cut away view of the interior.
Figure 2:
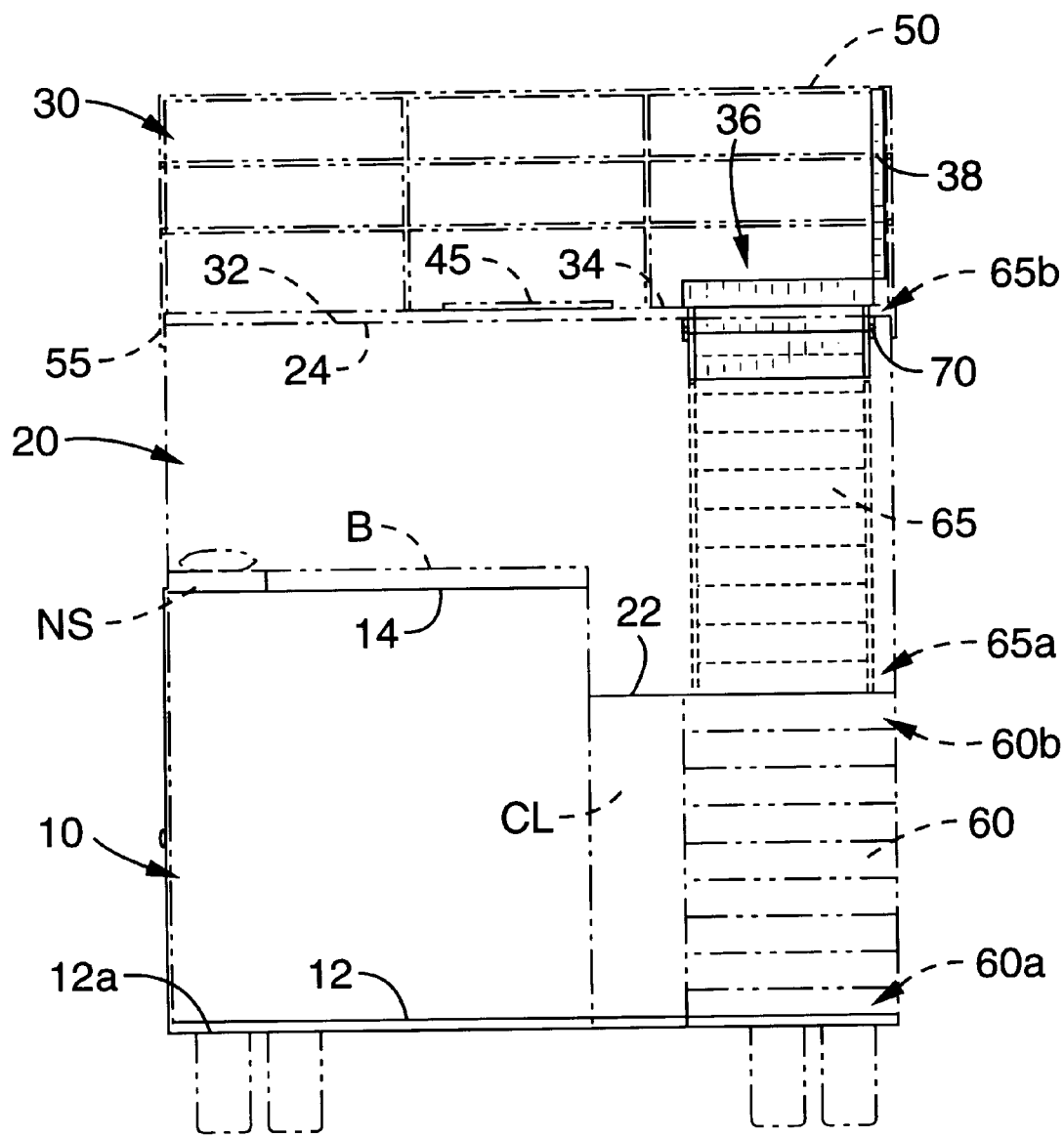
FIG. 2 is a cross-section view taken substantially on line 2—2 of FIG. 1.
Figure 3:
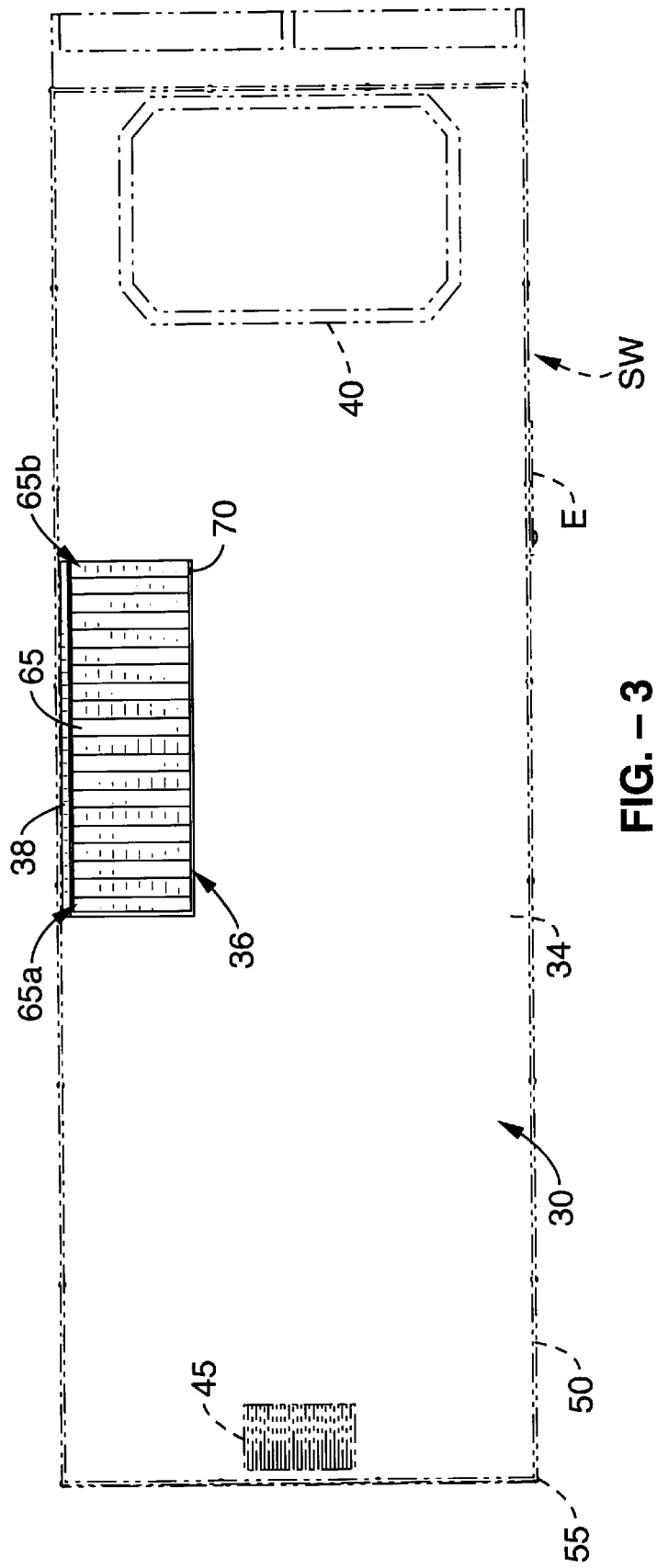
FIG. 3 is a top view of the invention showing the upper level.

Referring now to FIGS. 1–3, there is shown a preferred embodiment of a multi-level recreational vehicle. While the preferred embodiment displays a motor home, other embodiments are contemplated, including a fifth-wheel, a trailer, and a mobile home. A multi-level recreational vehicle 5 having a body chassis with side walls SW and an entrance E, wherein the body chassis is supported on frame rails FR, is disclosed that comprises at least three levels that are preferably fixed and non-collapsible. The levels include a lower lever 10, an intermediate level 20, and an upper level 30. The lower level 10 comprises a floor and a ceiling 14, wherein the lower level floor preferably has a walking portion or surface 12 and a lower portion or frame bottom 12a positioned proximate the frame rails FR, usually close to the bottom of the frame rails FR. The intermediate level 20 also comprises a floor 22 and a ceiling 24, wherein the intermediate level floor 22 preferably is staggered with the lower level ceiling 14 to provide approximately six feet in headroom for each the lower level 10 and the intermediate level 20 while the lower level floor and the intermediate level ceiling are only approximately ten feet apart. By staggering the lower level 10 and the intermediate level 20, space for headroom may be used, for example, although not exclusively, under a bed B or a night stand NS or in a closet CL or a cabinet.

Additionally, although not exclusively, upon entering the multi-level recreational vehicle 5, a ceiling height of approximately ten feet is contemplated at the entrance E thereby providing a "roomy atmosphere" impression upon entering this invention.

The upper level 30 has a floor 32, wherein the floor 32 generally comprises a deck 34, or the like, such that the upper level 30 may also provide living space. The deck 34 may be made of wood, outdoor carpet, or the like to provide an appropriate surface for the deck 30. The upper level 30 typically has an open top, although a cover, awning, or the like is contemplated, wherein the cover generally may be removed, retracted or dismantled for transport of the multi-level recreational vehicle 5. As shown in this embodiment, a hot tub 40, spa or the like, is positioned on the upper level 30, wherein the hot tub 40 mounts, preferably near the front of the multi-level recreational vehicle 5, approximately flush with the deck 34. Other items may be mounted on the deck 34, such as, although not exclusively, a sunken barbecue 45 or deck furniture.

Peripherally bordering the upper level 30 is a railing 50, wherein the railing 50 preferably telescopically collapses. Incorporated within or on the side walls SW are a plurality of sleeves 55, receptacles or the like to receive the collapsed railing 50. Preferably, the railing 50 may be collapsed during transport of the multi-level recreational vehicle 5, thereby protecting the collapsible railing 70 and providing more height clearance for the multi-level recreational vehicle 5.

Communication between the levels 10, 20, 30 may be accomplished by a stairway 60, 65. For access between the lower level 10 and the intermediate level 20, a first stairway 60, having a first end 60a and an second end 60b, communicates with the levels 10, 20, wherein the first end 60a associates with the lower level floor 12 and the second end 60b associates with the intermediate level floor 22. Preferably, the first stairway 60 is fixed or stationary. A second stairway 65, having a first end 65a and a second end 65b, communicates with the intermediate level 20 and the upper level 30, wherein the first end 65a associates with the intermediate level floor 22 and the second end 65b associates with the upper level floor 32. An opening 36 on the upper level floor 32 allows for passage from the second stairway 65 to the upper level 30. The second stairway 65 has a hinged means 70, preferably at the second end 65b, thereby allowing the second stairway to hinge, pivot, swivel, or the like. Preferably, although not exclusively, the hinged stairway 65, when not in use, may be retracted substantially flush to the intermediate level ceiling 24 thereby providing more living space and thereby sealing closed the opening 36. It is also contemplated that the opening 36 may have a cover 38 for additional sealing of the opening 36, wherein the cover 38 may be a door, a panel, or other suitable cover material.

An alternative means for accessing the levels 10, 20, 30 of the multi-level recreational vehicle is an elevator (not shown) so as to provide access for a person unable to easily manipulate a stairway. The elevator preferably allows for access, as the entrance E, from ground level and to each level 10, 20, 30 of the multi-level recreational vehicle 5.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A multi-level recreational vehicle having a body chassis supported on frame rails, wherein the recreational vehicle comprises:
   a) at least three levels designed for living space that are fixed and non-collapsible, and;
   b) means for accessing said levels of the recreational vehicle.

2. The recreational vehicle according to claim 1, wherein said levels comprise:
   a) a lower level having a floor and a ceiling;
   b) an intermediate level having a floor and a ceiling, and;
   c) an upper level having a floor.

3. The recreational vehicle according to claim 2, wherein said lower level floor comprises a walking portion positioned proximate the frame rails.

4. The recreational vehicle according to claim 2, wherein said lower level ceiling staggers with said intermediate level floor thereby allowing for maximum use of available space within the recreational vehicle.

5. The recreational vehicle according to claim 2, wherein said upper level comprises a deck for use when the recreational vehicle is stationary.

6. The recreational vehicle according to claim 2, wherein said upper level further comprises a railing, said railing substantially peripherally borders said upper level.

7. The recreational vehicle according to claim 1, wherein said access means comprises an interior stairway, said stairway having a hinging means, wherein said stairway may be retracted when not in use to provide for increased living space.

8. A multi-level recreational vehicle having a body chassis supported on frame rails, wherein the recreational vehicle comprises:
   a) at least three stationary levels, wherein said levels comprise:
      a lower level having a floor and a ceiling;
      at least one intermediate level having a floor and a ceiling;
      an upper level having a floor, and;
   b) means for accessing each said level.

9. The recreational vehicle according to claim 8, wherein said lower level floor comprises a walking portion positioned proximate the frame rails.

10. The recreational vehicle according to claim 8, wherein said lower level ceiling staggers with said intermediate level floor thereby allowing for maximum use of available space within the recreational vehicle.

11. The recreational vehicle according to claim 8, wherein said access means comprises an interior stairway, said stairway having a hinging means, wherein said stairway may be retracted when not in use to provide for increased living space.

12. The recreational vehicle according to claim 8, wherein said upper level comprises a deck.

13. The recreational vehicle according to claim 8, wherein said upper level further comprises a railing, said railing substantially peripherally borders said upper level.

14. The recreational vehicle according to claim 13, wherein said railing collapses.

15. A multi-level recreational vehicle having a body chassis with side walls, the body chassis being supported on frame rails, wherein the recreational vehicle comprises:
   a) at least three stationary or non-collapsible levels, said levels comprise:
      a lower level having a floor and a ceiling, wherein said lower level floor comprises a walking portion positioned proximate the frame rails thereby allowing for lower walking area;
      an intermediate level having a floor and a ceiling, wherein said intermediate level floor staggers with said lower level ceiling thereby maximizing living space;
      an upper level having a floor;
   b) a collapsible railing, wherein said collapsible railing substantially peripherally borders said upper level;
   c) access means to said levels, wherein said access means comprises a stairway having a hinging means, wherein said stairway having said hinging means may be retracted when not in use to provide for increased living space.

16. The recreational vehicle according to claim 15, wherein said upper level floor comprises a deck, wherein said deck being peripherally bordered by said collapsible railing.

17. The recreational vehicle according to claim 16, wherein the body walls of the recreational vehicle comprise a plurality of sleeves for receiving said collapsible railing when said railing is collapsed.

18. The recreational vehicle according to claim 16, wherein said upper deck further comprises a hot tub, wherein said hot tub is positioned substantially flush with said deck.

* * * * *